United States Patent [19]

Gold et al.

[11] Patent Number: 4,744,939

[45] Date of Patent: May 17, 1988

[54] METHOD FOR CORRECTING FOR ISOTOPE BURN-IN EFFECTS IN FISSION NEUTRON DOSIMETERS

[75] Inventors: Raymond Gold; William N. McElroy, both of Richland, Wash.

[73] Assignee: The United States of America as represented by the United States Department of Energy, Washington, D.C.

[21] Appl. No.: 897,555

[22] Filed: Aug. 18, 1986

[51] Int. Cl.$^4$ .......................... G21G 1/08; G01T 5/00
[52] U.S. Cl. .................................... 376/159; 376/154; 250/472.1; 250/474.1; 250/390
[58] Field of Search ............... 376/153, 154, 159, 257; 250/390 C, 390 R, 390 B, 390 E, 390 F, 472.1, 474.1

[56] References Cited

U.S. PATENT DOCUMENTS 3,222,521 12/1965 Einfeld ............................. 250/83.1
3,436,538 8/1969 Basdekas ........................ 250/83.1

FOREIGN PATENT DOCUMENTS 1061535 5/1967 UNITED KINGDOM

OTHER PUBLICATIONS

Conf. 9th Symp. on Eng. Problems of Fusion Research, Chicago, Ill. (Oct. 26-29, 1981) pp. 1080-1085, Groo.
W. N. McElroy, et al., "LWR Pressure Vessel Surveillance Dosimetry Improvement Program: 1982 Annual Report," NUREG/CR 2805, vol. 3, HEDL TME 82-20, Jan. 1983.
ASTM E706-81a, "Standard Master Matrix for Light-Water Reactor Pressure Vessel Surveillance Standards," 1983 Annual Book of ASTM Standards, vol. 12.02, p. 419, 1983.
R. L. Simons, L. S. Kellogg, E. P. Lippincott, W. N. McElroy and D. L. Oberg, "Reevaluation of the Dosimetry for Reactor Pressure Vessel Surveillance Capsules," NUREG/CP-0029, vol. 2, p. 903, Proceedings of the Fourth ASTM-Euratom Symposium on Reactor Dosimetry, Jul. 1983.
ASTM E704-79, "Standard Method for Measuring Fast-Neutron Flux Density by Radioactivation of Uranium-238," Annual Book of ASTM Standards, vol. 12.02, p. 409, Section 4.4, 1983.

Primary Examiner—Harvey E. Behrend
Attorney, Agent, or Firm—D. C. Abeles

[57] ABSTRACT

A method is described for correcting for effect of isotope burn-in in fission neutron dosimeters. Two quantities are measured in order to quantify the "burn-in" contribution, namely $P_{Z',A'}$, the amount of $(Z', A')$ isotope that is burned-in, and $F_{Z',A'}$, the fissions per unit volume produced in the $(Z', A')$ isotope. To measure $P_{Z',A'}$, two solid state track recorder fission deposits are prepared from the very same material that comprises the fission neutron dosimeter, and the mass and mass density are measured. One of these deposits is exposed along with the fission neutron dosimeter, whereas the second deposit is subsequently used for observation of background. $P_{Z',A'}$ is then determined by conducting a second irradiation, wherein both the irradiated and unirradiated fission deposits are used in solid state track recorder dosimeters for observation of the absolute number of fissions per unit volume. The difference between the latter determines $P_{Z',A'}$ since the thermal neutron cross section is known. $F_{Z',A'}$ is obtained by using a fission neutron dosimeter for this specific isotope, which is exposed along with the original threshold fission neutron dosimeter to experience the same neutron flux-time history at the same location. In order to determine the fissions per unit volume produced in the isotope $(Z', A')$ as it ingrows during the irradiation, $B_{Z',A'}$, from these observations, the neutron field must generally be either time independent or a separable function of time t and neutron energy E.

7 Claims, No Drawings

METHOD FOR CORRECTING FOR ISOTOPE BURN-IN EFFECTS IN FISSION NEUTRON DOSIMETERS

BACKGROUND OF THE INVENTION

The invention which is the subject of this application was created under a contract with the U.S. Department of Energy.

This invention relates to monitoring neutron fluence by dosimeters and, more particularly, to a method for correcting for "burn-in" or ingrowth of interfering fissioning isotopes during fission rate measurements for neutron dosimetry purposes.

Federal regulations require that reactor coolant pressure boundaries have sufficient margin to ensure that the boundary behaves in a non-brittle manner when stressed under operating, maintenance, testing, and postulated accident conditions, and that the probability of rapidly propagating fracture is minimized. These requirements necessitate prediction of the amount of radiation damage to the reactor vessel throughout its service life, which in turn requires that the neutron exposure to the pressure vessel be monitored.

Fission neutron monitors are often used in neutron dosimetry, and can provide pivotal fast flux spectral information, such as for light water reactor pressure vessel surveillance.

In neutron dosimetry, a fission monitor of charge Z and mass number A is exposed to a neutron beam having and energy spectrum $\phi$ (t, E) which generally is a function of time t and neutron energy E. During the irradiation, a higher order or larger atomic weight actinide isotope (Z', A') can be created by neutron capture in the (Z, A) isotope of the fission neutron dosimeter. Neutron capture actually produces the isotope (Z, A+1) and subsequently decay processes then create the (Z', A') isotope, with A'=A+1.

Consequently, the total number of fissions per unit volume, $F_T$, observed with this fission neutron dosimeter is given by:

$$F_T = F_{Z,A} + B_{Z',A'}$$

where $F_{Z,A}$ is the number of fissions per unit volume produced in the isotope (Z, A) and $B_{Z',A'}$ is the number of fissions per unit volume produced in the isotope (Z', A') as it ingrows during the irradiation. Although the quantity $F_{Z,A}$ is desired, $F_T$ is actually measured. The term $B_{Z',A'}$ represents a contribution from the higher order actinide (Z', A'), i.e., the so-called "burn-in" effect. In light water reactor pressure vessel surveillance work, this contribution can be non-negligible for a $^{238}U$ threshold fission monitor where burn-in effects arise from fission in $^{239}Pu$. In fact, recent analysis shows that the burn-in effect for $^{238}U$ can be as high as about 30 percent in light water reactor pressure vessel environments.

In light of the above, a method is desired for efficiently and accurately correcting for burn-in effects in fission neutron dosimeters.

SUMMARY OF THE INVENTION

Accordingly, it is an object of the present invention to provide a method for correcting for isotope burn-in effects in fission neutron dosimeters, which method is capable of adaptation to diverse geometries.

It is another object of the present invention to provide a method for correcting for isotope burn-in effects in fission neutron dosimeters, wherein relatively small dosimeters are employed that are capable of being used in situ with negligible perturbation of the environment.

It is another object of the present invention to provide a method for correcting for isotope burn-in effects in fission neutron dosimeters which is capable of high sensitivity and absolute accuracy.

It is another object of the present invention to provide a method for correcting for isotope burn-in effects in fission neutron dosimeters which is capable of quantifying background effects.

Finally, it is an object of the present invention to provide a method for correcting for isotope burn-in effects in fission neutron dosimeters which is capable of conducting measurements in extremely high neutron fluences.

To achieve the foregoing and other objects of the present invention, and in accordance with the purposes of the invention, there is provided a method for correcting for the burn-in effect in fission neutron dosimeters, wherein two quantities are measured in order to quantify the burn-in contribution, namely $P_{Z',A'}$, the amount of (Z', A') isotope that is burned in, and $F_{Z',A'}$, the fissions per unit volume that would be produced from the start of the irridation in a dosimeter made of the (Z', A') isotope. Monitors used to measure these two quantities must experience the very irradiation that the fission neutron dosimeter undergoes, i.e., the same location and flux-time history.

To measure the burn-in of the (Z', A') isotope, two solid state track recorder fission deposits are prepared from the very same material that comprises the fission neutron dosimeter and the two are quantified, i.e., the mass and mass density are measured. One of these deposits is exposed along with the fission neutron dosimeter, whereas the second deposit is subsequently used for observation of background, which is any fission track contribution from actinide impurities in the fission dosimeter. The amount of burn-in of the (Z', A') isotope is determined by conducting a second irradiation, wherein both the irradiated and unirradiated fission deposits are used in solid state track recorder dosimeters for observation of the absolute number of fissions per unit volume. The difference between these two absolute solid state track recorder measurements can be used to quantify the amount of burn-in since the neutron cross-section is known.

The fissions per unit volume of the (Z', A') isotope can be obtained by using a fission neutron dosimeter prepared specifically for this isotope. The (Z', A') fission dosimeter is exposed along with the original threshold fission neutron dosimeter, so that it experiences exactly the same neutron flux-time history at the same location.

In order to determine $B_{Z',A'}$ from these observations, certain assumptions on the time dependence of the neutron field must hold. More specifically, the neutron field must generally be either:

(1) time independent, or
(2) a separable function of time t and neutron energy E.

Reactor irradiations can often be carried out at constant power, in which event assumption (1) would be valid. In the case that assumption (1) does not hold, assumption (2) is quite likely to be valid. Moreover, for this case, the reactor power intrumentation can often be used to determine the separable time-dependent behavior of the neutron field.

DETAILED DESCRIPTION OF THE PREFERRED EMBODIDMENTS

As discussed above, when fission neutron dosimeters are applied to neutron dosimetry, such as those used for surveillance in light water reactor pressure vessels, higher order actinide isotopes can be produced in the dosimeter by the neutron field. These higher order actinide isotopes can also undergo fission and thereby contribute to the number of fissions or fission rate that is observed with the dosimeter. This application describes a novel method which uses solid state track recorders to correct for burn-in.

In this method, two quantities are measured in order to quantify the burn-in contribution, namely $P_{Z', A'}$, the amount of (Z', A') isotope that is burned in, and $F_{Z', A'}$, the fissions per unit volume produced in the (Z', A') isotope. Monitors used to measure these two quantities must experience the very same irradiation that the fission neutron dosimeter undergoes, i.e., it must be at the same location and exposed to the same flux-time history.

To measure the amount of burn-in of the (Z', A') isotope $P_{Z', A'}$, two solid state track recorder fission deposits are prepared from the very same material that comprises the fission neutron dosimeter. These two solid state track recorders are then quantified by accurately measuring the mass and mass density thereof. One of these deposits is exposed by placing it against the fission neutron dosimeter, whereas the second deposit is subsequently used for observation of background. The amount of burn-in of the (Z', A') isotope $P_{Z', A'}$ is determined by conducting a second irradiation, wherein both the irradiated and unirradiated fission deposits are used in solid state track recorder dosimeters for observation of the absolute number of fissions per unit volume.

For example, the $^{239}$Pu burn-in produced by using a $^{238}$U fission neutron dosimeter is most efficiently observed by using a thermal neutron field for the second irradiation. Here the second solid state track recorder dosimeter is used to measure any fission background that can arise in the original fission neutron dosimeter material. The difference between these two absolute solid state track recorder measurements can be used to quantify the amount of $^{239}$Pu, since the thermal neutron cross section of $^{239}$Pu is well known.

The fissions per unit volume $F_{Z', A'}$ of the (Z', A') isotope can be obtained by using a fission neutron dosimeter prepared specifically for this isotope. For example, a radiometric fission dosimeter could be used for this purpose. A radiometric fission recorder is a dosimeter which measures the radioactivity of a specific fission product isotope. From the absolute radioactivity of this fission product isotope, the fission rate is determined. A solid state track recorder fission dosimeter could also be used for this purpose. In any event, the (Z', A') fission dosimeter is exposed along with the original threshold fission neutron dosimeter, so that it experiences exactly the same neutron flux-time history at the same location.

In order to determine the burn-in from these observations, i.e., the term $B_{Z', A'}$ in the above equation, certain assumptions on the time dependence of the neutron field must hold. More specifically, the neutron field must generally be either:

(1) time independent; or (2) a separable function of time t and neutron energy E.

For the latter case, the term $B_{Z', A'}$ must be expressible as the product of two functions, one of which is a function of time t only and the other being a function of neutron energy E only.

Reactor irradiation can often be carried out at constant power, in which event assumption (1) would be valid. In the latter case that assumption (1) does not hold, assumption (2) is quite likely to be valid. Moreover, for this latter case, the reactor power instrumentation record can often be used to determine the separable time-dependent behavior of the neutron field. The use of these assumptions in the determination of the burn-in term, $B_{Z', A'}$, is discussed below in greater detail.

Let $\dot{f}_{Z, A}(t)$ and $\dot{f}_{Z', A'}(t)$ be the fission rates of the (Z, A) and (Z', A') isotopes per nucleus, respectively. These fission rates can be expressed in the form:

$$\dot{f}_{Z,A}(t) = \int_0^\infty \phi(t,E)\sigma^f_{Z,A}(E)\, dE \tag{1}$$

and $$\dot{f}_{Z',A'}(t) = \int_0^\infty \phi(t,E)\sigma^f_{Z',A'}(E)\, dE \tag{2}$$

where $\sigma^f_{Z,A}(E)$ and $\sigma^f_{Z',A'}(E)$ are the fission cross section of the (Z, A) and (Z', A') isotopes, respectively. Here $\phi(t, E)$ represents the neutron spectrum which generally depends on time t as well as neutron energy E.

For a reactor irradiation of duration $\tau$, the total fissions per nucleus $F_{Z, A}(\tau)$ and $F_{Z', A'}(\tau)$ produced in the (Z, A) and (Z', A') isotopes, respectively, can be obtained by integration of Equations (1) and (2) over time t, so that:

$$F_{Z,A}(\tau) = \int_0^\tau dt \int_0^\infty \phi(t,E)\sigma^f_{Z,A}(E) \tag{3}$$

and $$F_{Z',A'}(\tau) = \int_0^\tau dt \int_0^\infty \phi(t,E)\sigma^f_{Z',A'}(E)\, dE \tag{4}$$

During this irradiation, let $\dot{p}_{Z', A'}$ be the rate of burn-in, that is, the production of the isotope that is created by neutron capture in the (Z, A) isotope of the fission neutron dosimeter at time t. Under the assumption that the half-life of the decay processes forming the (Z', A') isotope are negligible compared with reactor irradiation times, this production rate can be expressed in terms of the neutron capture cross section $\sigma^C_{Z, A}(E)$ of the (Z, A) isotope:

$$\dot{p}_{Z',A'}(t) = n_{Z,A} \int_0^\infty \phi(t,E)\sigma^C_{Z,A}(E)\, dE \tag{5}$$

where $n_{Z, A}$ is the atom density of the (Z, A) isotope. Atom density can be expressed in atoms per unit volume or atoms per unit mass.

Hence, the density $P_{Z', A'}(t)$ of the production of the isotope (Z', Z') at any time $t \leq \tau$ during the irradiation interval $\tau$, is given by:

$$P_{Z',A'}(t) = \int_0^t \dot{p}_{Z',A'}(t')\,dt' \tag{6}$$

which can be written as:

$$P_{Z',A'}(t) = n_{Z,A} \int_0^t dt' \int_0^\infty \phi(t',E)\sigma_{Z,A}^C(E)\,dE \tag{7}$$

Equation (7) assumes there is negligible loss in $n_{Z,A}$ over the irradiation time. This assumption is usually satisfied. If it is not, the method described herein is still valid and the actual time dependence of $n_{Z,A}$ can be taken into account in going from Equation (6) to (7).

Consequently, the fission density $B_{Z',A}$, produced by the burn-in of the (Z', A') isotope during the irradiation can be expressed as:

$$B_{Z',A'} = \int_0^\tau P_{Z',A'}(t)\dot{f}_{Z',A'}(t)\,dt \tag{8}$$

where $P_{Z',A'}(t)$ is given by Equation (7) and $\dot{f}_{Z',A'}(t)$ is given by Equation (2).

While $B_{Z',A'}$ is the desired burn-in term, what is actually measured is production during the irradiation of duration $\tau$, $P_{Z',A'}(\tau)$ and the total fissions per nucleus $F_{Z',A'}(\tau)$ from the irradiation of duration $\tau$. Consequently, it is of interest to examine the conditions under which $B_{Z',A'}$ can be obtained from Equation (8) in terms of the observed quantities $P_{Z',A'}(\tau)$ and $F_{Z',A'}(\tau)$. For a neutron field independent of t, one has $100\,(t,E) = \phi(E)$ and Equation (8) becomes:

$$B_{Z',A'} = n_{Z,A} \cdot \tau^2/2 \cdot$$

$$\int_0^\infty \phi(E)\sigma_{Z,A}^C(E)\,dE \cdot \int_0^\infty \phi(E)\sigma_{Z',A'}^f(E)\,dE \tag{9}$$

For the time-independent case, Equations (4) and (7) give, respectively:

$$F_{Z',A'}(\tau) = \tau \cdot \int_0^\infty \phi(E)\sigma_{Z',A'}^f(E)\,dE \tag{10}$$

and $$P_{Z',A'}(\tau) = n_{Z,A} \cdot \tau \cdot \int_0^\infty \phi(E)\sigma_{Z,A}^C(E)\,dE \tag{11}$$

Using Equations (10) and (11) in Equation (9), one finds for the time-independent case:

$$B_{Z',A'} = \tfrac{1}{2}\{P_{Z',A'}(\tau) \cdot F_{ZZ',A'}(\tau)\} \tag{12}$$

For the case of a separable time-dependent behavior of the neutron field, one can write:

$$\phi(t,E) = T(t)\cdot\phi_o(E) \tag{13}$$

Here the time-dependent term T(t), is known from reactor power instrumentation records. Using this assumption in Equation (8), one finds:

$$B_{Z',A'} = n_{Z,A} \int_0^\tau T(t)\left[\int_0^t T(t')dt'\right]dt \int_0^\infty \phi_0(E)\sigma_{Z,A}^C(E)\,dE \int_0^\infty \phi_0(E)\sigma_{Z',A'}^f(E)\,dE \tag{14}$$

Also under this assumption, $P_{Z',A'}(\tau)$ and $F_{Z',A'}(\tau)$ become, respectively:

$$P_{Z',A'}(\tau) = n_{Z,A}\left(\int_0^\tau T(t)dt\right)\cdot \int_0^\infty \phi_0(E)\sigma_{Z,A}^C(E)\,dE \tag{15}$$

and $$F_{Z',A'}(\tau) = \left(\int_0^\tau T(t)dt\right)\cdot \int_0^\infty \phi_0(E)\sigma_{Z',A'}^f(E)\,dE \tag{16}$$

Using Equations (15) and (16) in Equation (14), one finds the burn-in term can be expressed in the form:

$$B_{Z',A'} = \frac{\int_0^\tau T(t)\left[\int_0^t T(t')dt'\right]dt}{\left[\int_0^\tau T(t)dt\right]^2}\{P_{Z',A'}(\tau)\cdot F_{Z',A'}(\tau)\} \tag{17}$$

Except for the time-dependent integrals, Equation (17) is of the same form as Equation (12). Indeed, for T(t)=constant, one finds Equation (17) reduces to Equation (12). More generally, the coefficient in Equation (17) arising from the time-dependent integrals can be evaluated using known reactor power instrumentation measurements, which define the separable time-dependent function T(t). That is, chart recorders, usually located in the reactor operations room, provide a record of the power time history of the reactor irradiation.

The method described above can be applied in a number of other ways. The original fission monitor for the (Z, A) isotope, in which $F_T$ fissions per unit volume are observed, may be either a radiometric or solid state track recorder fission dosimeter. The fission rate in the (Z', A') isotope can also be observed with either a radiometric or solid state track recorder fission dosimeter. The requirements of the specific application at hand will usually dictate which type of dosimeters are employed. For example, extremely thin solid state track recorders can be expressed for the (Z, A) and (Z', A') isotopes, so that infinitely dilute fission rate measurements can be conducted. Hence in applications where resonance self-shielding is non-negligible, use of solid state track recorder dosimeters are recommended for both (Z, A) and (Z', A') fission rate observations.

On the other hand, radiometric fission dosimeters do not possess the fluence limitations of solid state track recorders, and consequently can be used for very high fluence applications. In the event resonance self-shielding is non-negligible, extremely thin solid state track recorder deposits of both (Z, A) and Z', A') isotopes can serve as radiometric dosimeters for infinitely dilute fission rate measurements of very high fluence. The solid state track recorder deposit for the (Z, A) isotope would then be available for use in follow-on irradiations to determine the burn-in term.

This method may also be applied retroactively to correct fission rate measurements already conducted with radiometric dosimeters. This is particularly important for light water reactor pressure vessel surveillance work, where extensive radiometric fission dosimeters already exist. In such cases, solid state track recorder deposits would be prepared from irradiated and unirradiated radiometric dosimeters that were used for the original (Z, A) fission rate measurement. These deposits could then be used to determine the amount of the (Z', A') isotope that was burned-in. It must be stressed that this burn-in determination can in principle account for any resonance self-shielding introduced by the radiometric dosimeter. To complete this correction, the fission rate in the (Z', A') isotope for the original reactor irradiation must be known. If the fission rate in the (Z', A') isotope was not measured during the original reactor irradiation, it would have to be determined by either measurement or calculation. Measurement would entail a second irradiation of a radiometric or solid state track recorder fission dosimeter, which should duplicate the original irradiation as closely as possible. In either event, the observed (Z', A') fission rate would require a calculated correction for resonance self-shielding.

The method described above possesses all the advantages of passive techniques used for neutron dosimetry, such as radiometric dosimetry, and also includes the following advantages:

(1) easily adapted to diverse geometries;

(2) dosimeters can be small in size and therefore can be used in-situ with negligible perturbation of the environment;

(3) high sensitivity and absolute accuracy are available;

(4) background effects can be quantified; and (5) since radiometric dosimetry can be applied to observe fissions per unit volume induced in the (Z', A') and (Z, A) isotopes during the irradiation, measurements can be conducted to extremely high fluence.

The foregoing is considered illustrative only of the principles of the invention. Further, since numerous modifications and changes will readily occur to those skilled in the art, it is not desired to limit the invention to the exact construction and operation shown and described. Accordingly, all suitable modifications and equivalents, falling with the scope of the invention and the appended claims may be resorted to.

We claim:

1. A method for correcting for burn-in in a fissionable neutron dosimeter employing a fissionable isotope (Z, A), comprising the steps of:

(a) forming two solid state track recorders with fission deposits of the same fissionable material as the fissionable neutron disometer;

(b) exposing a first of the two solid state track recorders and the fissionable neutron dosimeter to a first neutron fluence, at least effectively with the same neutron flux-time history with respect to the location of one of them in the first neutron fluence, whereafter the fissionable neutron dosimeter indicates a total number of fissions $F_T$ which is to be corrected for the burn-in;

(c) irradiating the two solid state track recorders with a second neutron fluence;

(d) determining the amount of burn-in $P_{Z', A'}$ of a higher order isotope (Z', A'), wherein A'>A, in the fission deposit of the first solid state track recorder from the difference between the absolute numbers of fissions per unit volume of the fission deposits in the two solid state track recorders;

(e) determining the number of fissions $F_{Z', A'}$ of the higher order isotope (Z', A') in the fissionable deposit of the first solid state track recorder during the exposure to the first neutron fluence; and (f) using $P_{Z', A'}$ and $F_{Z', A'}$ to correct the total number of fissions $F_T$ indicated by the fissionable neutron dosimeter, to provide a value corresponding to the fission rate of the fissionable isotope that is corrected for the fissions due to the burn-in.

2. The method as recited in claim 1, wherein the first neutron fluence is time independent or a separable function of time and neutron energy.

3. The method as recited in claim 2, wherein the step (e) of determining the number of fissions $F_{Z', A'}$ of the higher order isotope (Z', A') further comprises the substep of exposing a further fission neutron dosimeter prepared for the higher order isotope (Z', A') to at least effectively the same neutron flux-time history at the same location in the first neutron fluence.

4. The method as recited in claim 2, wherein the fission neutron dosimeter for which the burn-in is to be corrected is selected from the group consisting of a radiometric fission dosimeter and a solid state track recorder fission dosimeter.

5. The method as recited in claim 3, wherein the further fission neutron dosimeter is selected from the group consisting of a radiometric fission dosimeter and a solid state track recorder fission dosimeter.

6. The method as recited in claim 2, wherein the step (b) further comprises the substep of exposing the first solid state track recorder fission deposit and the fissionable neutron dosimeter to be corrected for the burn-in at separate times but for corresponding periods and neutron fluxes at the same location.

7. The method of claim 1, further comprising the step of determining the value of the first neutron fluence based on the total number of fissions $F_T$ as corrected for the burn-in.

* * * * *